United States Patent [19]
Bingle et al.

[11] Patent Number: 5,986,364
[45] Date of Patent: Nov. 16, 1999

[54] HOUSING WITH INTEGRAL WEATHER SEALS AND NOISE DAMPENERS FOR A REARVIEW MIRROR ACTUATOR ASSEMBLY

[75] Inventors: Robert Lee Bingle; David Kevin Willmore, both of Holland; Robert E. Schnell, Zeeland, all of Mich.

[73] Assignee: Donnelly Corporation, Holland, Mich.

[21] Appl. No.: 08/838,008

[22] Filed: Apr. 14, 1997

[51] Int. Cl.[6] .............................. H02K 15/14; H02K 5/24; B60R 1/06
[52] U.S. Cl. ................................. 310/51; 310/89; 310/43; 359/873; 359/874; 359/879
[58] Field of Search ................................. 310/51, 89, 43; 359/873, 874, 877

[56] References Cited

U.S. PATENT DOCUMENTS

| | | | |
|---|---|---|---|
| 4,498,738 | 2/1985 | Kumai | 350/637 |
| 4,770,522 | 9/1988 | Alten | 350/633 |
| 4,815,837 | 3/1989 | Kikuchi et al. | 350/637 |
| 4,841,190 | 6/1989 | Matsushita et al. | 310/257 |
| 4,867,408 | 9/1989 | Ozaki | 248/483 |
| 4,881,705 | 11/1989 | Kraus | 248/74.2 |
| 4,915,493 | 4/1990 | Fisher et al. | 350/634 |
| 4,930,370 | 6/1990 | Yoshida | 74/502.1 |
| 5,007,725 | 4/1991 | Manzoni | 350/633 |
| 5,194,038 | 3/1993 | Klomhaus et al. | 454/162 |
| 5,274,505 | 12/1993 | Nagayama et al. | 359/874 |
| 5,497,275 | 3/1996 | Perry et al. | 359/873 |

FOREIGN PATENT DOCUMENTS 8108798  4/1996  Japan .

Primary Examiner—Nestor Ramirez
Assistant Examiner—Karl Imayoshi Tamai
Attorney, Agent, or Firm—Van Dyke, Gardner, Linn & Burkhart, LLP

[57] ABSTRACT

A housing member for an actuator assembly for adjusting the orientation of a mirror element in a mirror assembly provides integral weather seals and noise dampeners. The weather seals and noise dampeners are injection molded with or onto a base wall of the housing member to thereby form seals and dampeners that have superior adhesion or mechanical retention to the housing member and, therefore, are not subject to degradation from noise. In addition, the integral seals and dampeners reduce the time and cost of assembling and servicing the actuator assembly. The housing member includes a base wall, and a sidewall which connects to the base wall and extends around the perimeter of the base wall. The side wall includes connectors for securing the first housing to the second housing. A gasket material is injection molded around the passage to thereby seal the passage, which forms an annular lip on the inner surface of the base wall and extends through the base wall to form a flexible diaphragm on the outer surface of the base wall. The flexible diaphragm includes a first opening molded around the passage and a second opening for receiving and sealingly engaging a positioning member, wherein the second opening moves in and out of the passage with the positioning member when the positioning member extends out or withdraws into the actuator.

37 Claims, 7 Drawing Sheets

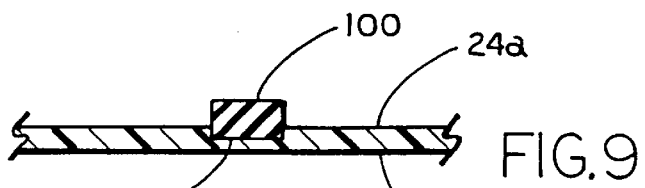
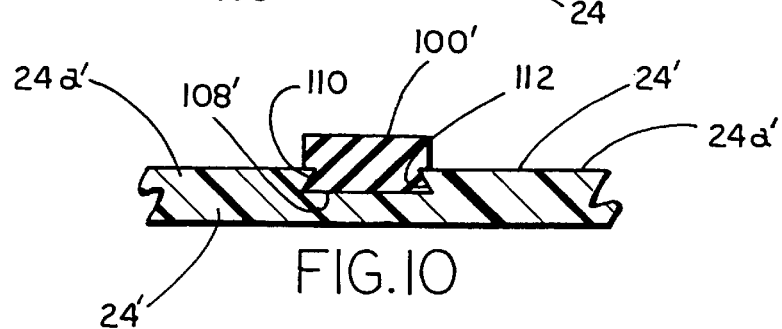
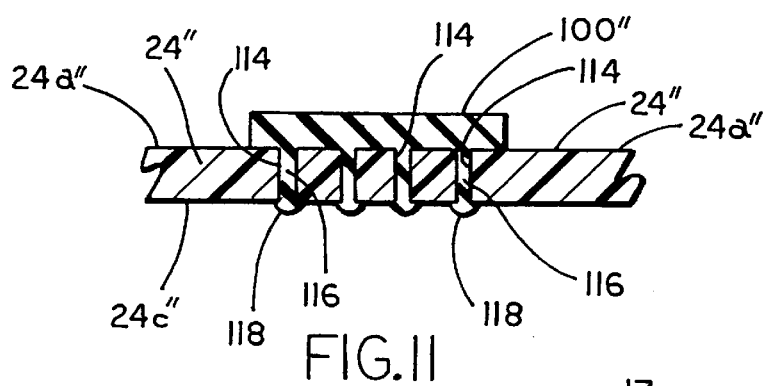
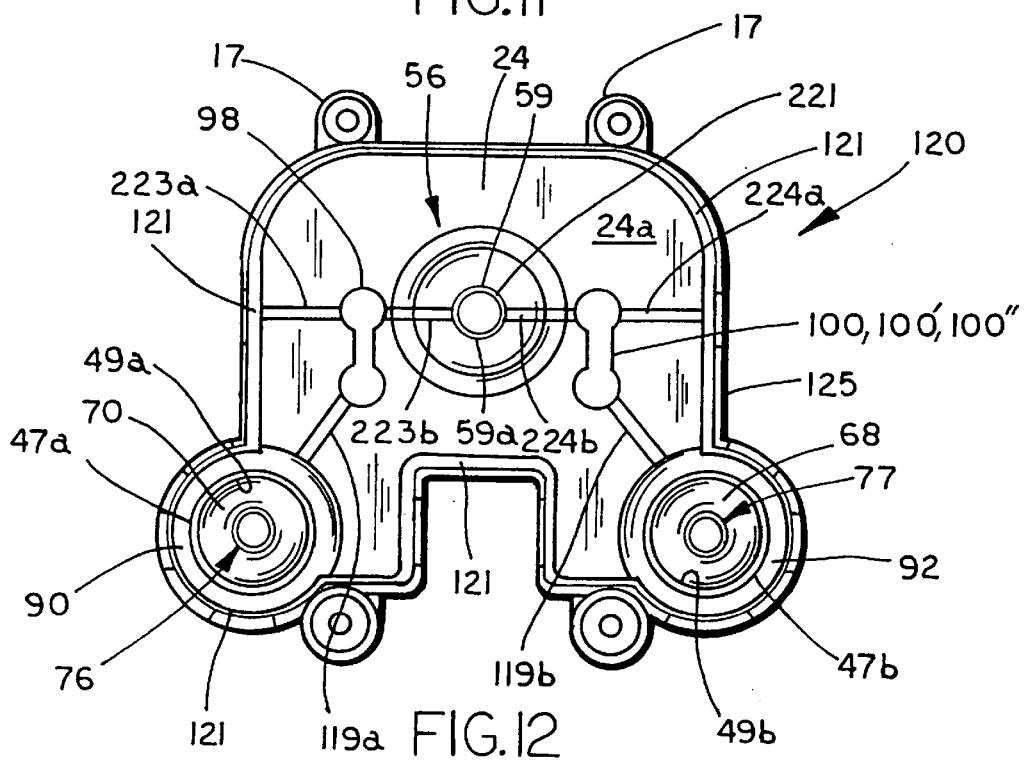

HOUSING WITH INTEGRAL WEATHER SEALS AND NOISE DAMPENERS FOR A REARVIEW MIRROR ACTUATOR ASSEMBLY

TECHNICAL FIELD AND BACKGROUND OF THE INVENTION

The present invention relates to an electrically-operated mirror actuator assembly which is used in vehicles for remote adjustment of a reflective mirror element in a rearview mirror assembly, especially an exterior rearview mirror assembly. More particularly, the present invention relates to the housing for the mirror actuator assembly in which weather seals and motor noise dampeners are integrally formed with the housing, preferably by injection molding.

Today most adjustable exterior rearview mirror assemblies include a mirror actuator assembly. The mirror actuator assembly is powered by a 12-volt supply from the vehicle or vehicle ignition system and is supported and housed in the mirror assembly casing. The actuator assembly comprises an actuator housing and one or more motors with appropriate gearing, which are supported in the actuator housing. Conventional actuator housings typically include upper and lower housing members, with the actuator motor and gearing supported in the lower housing member. The actuator motor drives the gearing, which in turn drives a positioning member. During operation, actuator motors tend to generate noise that can be heard by the operator and passengers of the vehicle. Since the trend in automobile design is to reduce noise so that the operator and passengers can enjoy a peaceful ride, noise dampeners are employed to reduce the motor noise. Heretofore, these noise dampeners have been manually inserted into and affixed to the housing; therefore, their installation is labor intensive, which increases the cost of the actuator assemblies.

The positioning member of the actuator assembly is drivingly coupled to the gearing and projects through the upper housing member through openings formed in the housing to engage the back of a mirror element backing plate. The mirror backing plate is pivotally mounted to the upper housing member by a ball mount or semi-spherical structure which engages a corresponding pivot structure provided on the upper housing member of the actuator assembly. In this manner, the mirror element and mirror backing plate pivot as a unit about the pivot structure in response to the movement of the positioning member, which is driven to extend and withdraw in and out of the actuator housing by the actuator motor and gearing.

Since actuator assemblies are used in exterior rearview mirror assemblies they are exposed to numerous elements, such as rain and road spray, which could adversely affect their operation and functionality. Consequently, conventional actuators used in exterior rearview mirrors include weather seals, which are needed to seal the openings in the housing, for example, the openings in the upper housing through which the mirror positioning member extends and the connection between the upper and lower housing members. These weather seals prevent moisture and debris, which are typically encountered during use of the vehicle, from entering the actuator housing. The positioning member opening of the upper housing is typically sealed with a flexible boot. Boots typically include a first open end engaging the upper housing member over the mirror positioning member opening and a second open end engaging the positioning member wherein the second open end moves in and out of the opening in the upper housing member in response to the movement of the positioning member. These boots require manual installation and must be accurately seated on the upper housing member in order to assure proper sealing.

Conventional perimeter or gasket seals comprise a die cut gasket which is positioned between the upper and lower housing members. Die cut gaskets are labor intensive. First, the gasket cutting is subject to tight tolerance control—otherwise, there may be fit-up problems in the assembly line. Furthermore, they require careful alignment between the housing members to assure the integrity of the seal. Heretofore, all these seals have required manual insertion into the mirror actuator assembly and careful alignment in their respective openings to assure proper sealing. Hence, these seals add considerable cost to the manufacture and assembly process.

In some actuators, the gasket seal is eliminated. To eliminate the gasket seal, these actuator housings include a tongue and groove connection, with one of the upper and lower housing members including the groove, and the other member including the tongue. However to achieve the desired sealing characteristics, the tongue requires a knife edge on the perimeter of the respective housing member. These knife edge perimeters are difficult to tool and mold because the upper and lower housing members are subject to tight tolerance control—again, the need for proper fit-up in the assembly line.

Consequently, there is a need for an actuator housing that requires fewer manual steps to assemble and yet provides seals to protect the actuator housing from the elements and, optionally, dampeners to reduce the motor noise characteristics of the actuator assembly. Furthermore, there is a need for an actuator assembly that produces less noise.

SUMMARY OF THE INVENTION

Accordingly, the present invention provides an improved actuator housing member, especially suited for use in an exterior mirror assembly that is subject to noise and exposure to numerous elements, which includes integral seals and noise dampeners that seal the actuator housing from the elements while providing dampening to the actuator motors. Additionally, the integral seal and dampeners reduce the number of manual steps in the assembly process and in the reassembly process when the actuator assembly is in need of service or repair, saving time and cost.

In one form of the invention, an upper housing member for an electrically-operated actuator assembly includes a base wall having a passage for receiving a mirror positioning member and a side wall, which connects to the base wall and extends around the perimeter of the base wall. The side wall includes at least one connector for securing the upper housing to a lower housing of the actuator assembly. A gasket material is injection molded around the passage to form an annular lip on an inner surface of the base wall and extends through the base wall to form a flexible diaphragm adjacent the outer surface of the base wall. The flexible diaphragm includes a first opening, which is injection molded to the base wall around the passage, and a second opening for receiving and sealingly engaging the positioning member, wherein portions of the flexible diaphragm which define the second opening move in and out of the passage with the positioning member when the gearing in the actuator drives the positioning member to extend out or withdraw into the actuator assembly.

In one aspect, the lip is connected to the flexible diaphragm in one or more locations. Furthermore, the base wall may include at least one aperture adjacent the passage, with the lip being connected to the flexible diaphragm through the aperture.

In another aspect, the flexible diaphragm includes a collar for engaging the positioning member, the second open end being defined by a throughbore in the collar. Preferably, the inner surface of the collar conforms to the shape of the positioning member to thereby provide increased sealing contact between the collar and the positioning member.

According to another aspect of the invention, an upper housing member for an electrically-operated actuator similarly includes a base wall having a passage for receiving a mirror positioning rod and a side wall which connects to and extends around the base wall. The side wall includes at least one connector for securing the upper housing member to a lower housing member of the actuator. Gasket material is injection molded onto the base wall to form one or more noise dampeners. The dampeners extend from the inner surface of the base wall to provide dampening to a motor supported in the lower housing member when the upper housing member is secured to the lower housing member.

In other aspects, the base wall includes a depression or groove into which the gasket material is injected. In form, the base includes a plurality of openings extending therethrough. The gasket material of the noise dampener is injection molded on the base wall over the openings so that the gasket material extends through the base wall in the openings to form leads and enlarged ends, which mechanically lock the noise dampener on the base wall of the first housing member.

According to yet another aspect of this invention, an upper housing member includes a base wall with a passage for receiving a mirror positioning member and a side wall, which connects to the base wall and extends around the perimeter of the base wall. The side wall includes a shoulder on which gasket material is injection molded to form a gasket seal for sealing the upper housing member to a lower housing member of the actuator when the upper housing member is secured to the lower housing member.

In yet another aspect, the upper housing member further includes an injection molded flexible diaphragm for sealing the passage in the base wall. In another aspect, the base wall includes one or more noise dampeners injection molded thereon.

Accordingly, the present invention provides for a simplified actuator assembly by injection molding gasket material with or onto the upper housing member, thus providing an integrally formed boot, noise dampener, and/or gasket seal in the upper housing member of the actuator assembly. The integral gasket components eliminate the need for manual insertion of the components and the need for die cutting a gasket seal and the attendant problems with positioning the gasket seal between the upper and lower housing members. Consequently, the integral seal and noise dampening components reduce material waste and labor. The seals and dampeners also reduce noise. Moreover, the integral seals and dampeners provide a modular actuator assembly that is easily serviceable.

These and other objects, advantages, purposes and features of the invention will become more apparent from a study of the following description taken in conjunction with the drawings.

BRIEF DESCRIPTION OF THE DRAWINGS

FIG. 9 is a cross-sectional view of the cover taken along line IX—IX of FIG. 8;

FIG. 10 is a cross-sectional view similar to FIG. 9 of a second embodiment of the noise dampener;

FIG. 11 is a cross-sectional view of a third embodiment of the noise dampener but taken in the direction of line XI—XI of FIG. 8;

FIG. 12 is a bottom plan view of a second embodiment of the cover of the actuator assembly illustrating the cover interior with an integral perimeter seal;

DESCRIPTION OF THE PREFERRED EMBODIMENTS

Figure 1:
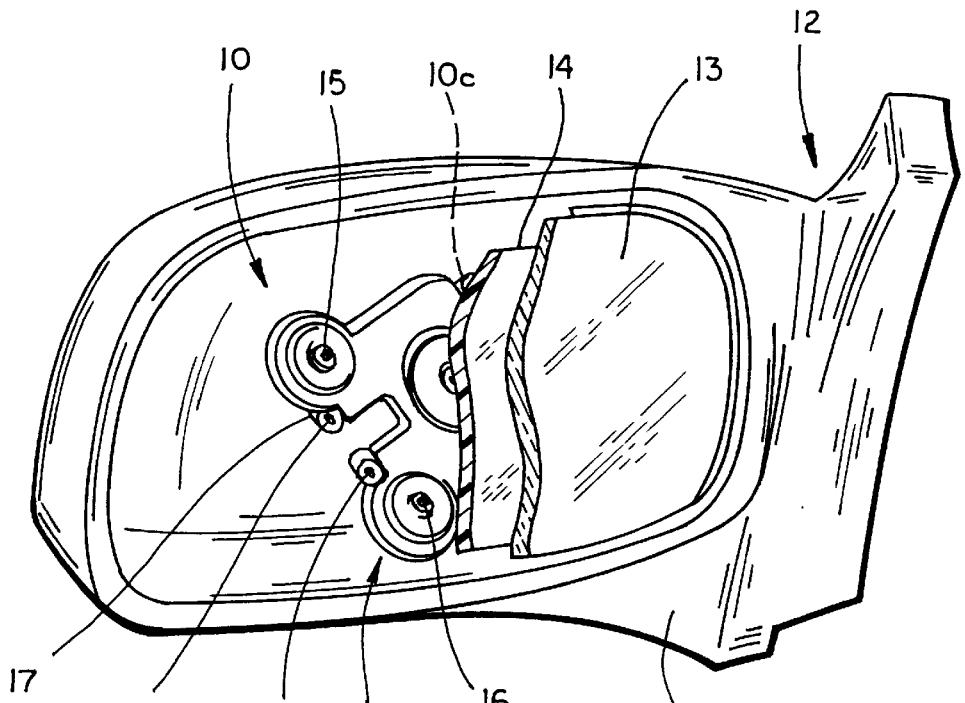
FIG. 1 is a perspective view of an actuator assembly of the present invention supported in an exterior rearview mirror assembly.

Referring to FIG. 1, the actuator assembly 10 of the present invention is shown mounted in a casing 11 of a vehicle exterior rearview mirror assembly 12. Casing 11 houses a mirror element 13 with a backing plate 14 and actuator assembly 10, which engages the back surface of backing plate 14 to adjust the orientation of mirror element 13 and backing plate 14. Actuator assembly 10 adjusts the orientation of minor element 13 through motor driven, telescoping, positioning members 15 and 16, which push and pull on the back of backing plate 14, as will be more fully described below.

Figure 2:
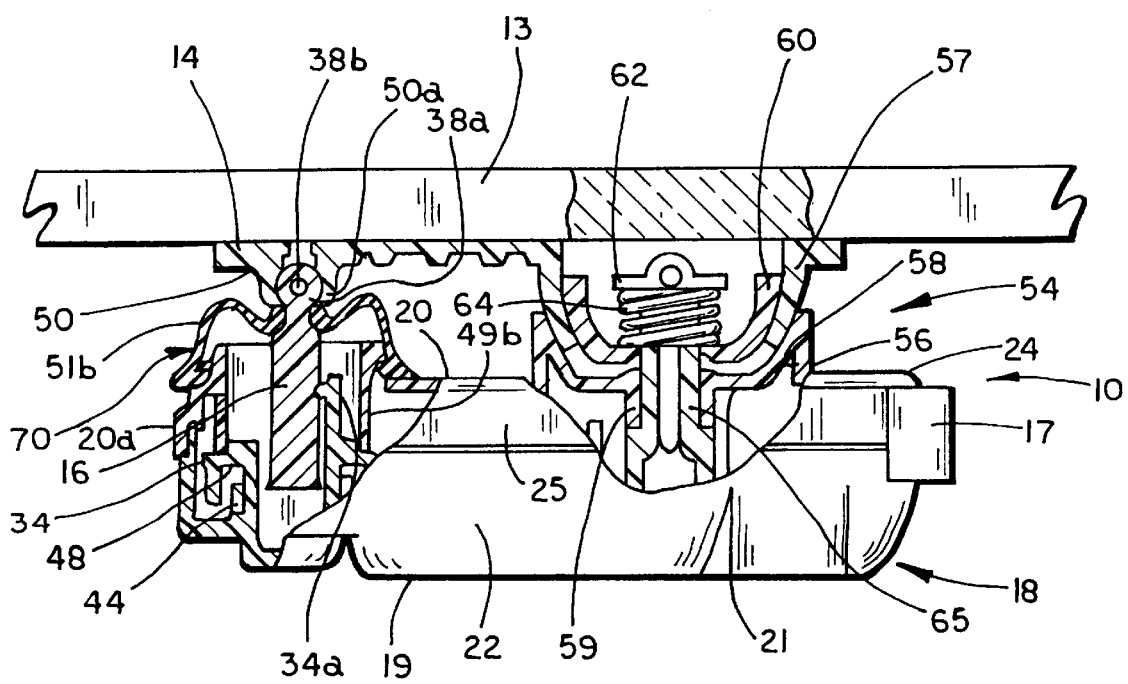
FIG. 2 is a side elevational view of the actuator assembly and a mirror element and backing plate with a partial cut-away.

As best seen in FIG. 2, actuator assembly 10 includes an actuator housing 18. Actuator housing 18 preferably includes a split construction housing having a first or base housing member 19 and a second or upper housing member 20 which is secured in casing 11 by fasteners, such as screws or bolts, that extend through boss structures 17 provided on upper housing member 20. Actuator housing 18 may also comprise a single molded member having a living hinge that divides the member into two sections, which fold to form an enclosure, for example a clam shell housing. As will be more fully explained, actuator housing 18 includes molded seals and noise dampeners. The seals and dampeners are thermoplastic elastomeric gasket material and injection molded with housing 18. Preferably, the housing members are molded from a non-conductive material such as resinous plastic. More preferably, housing members 19 and 20 comprise a glass-filled polypropylene, which results in chemical bonding between the gasket material and the housing and aids in the adhesion between the softer gasket material and the harder, more rigid housing substrate. The seals and dampeners may be similarly mechanically bonded with housing members 19 and 20, in which case housing members 19 and 20 are preferably a suitable thermoplastic resin, such as acrylonitrile butadiene styrenes (ABS) or polybutylene terephthalate (PBT) or other suitable melt processable resins. ABS is available under the tradename of MAGNUM from Dow Chemical of Midland, Mich.

Figure 3:
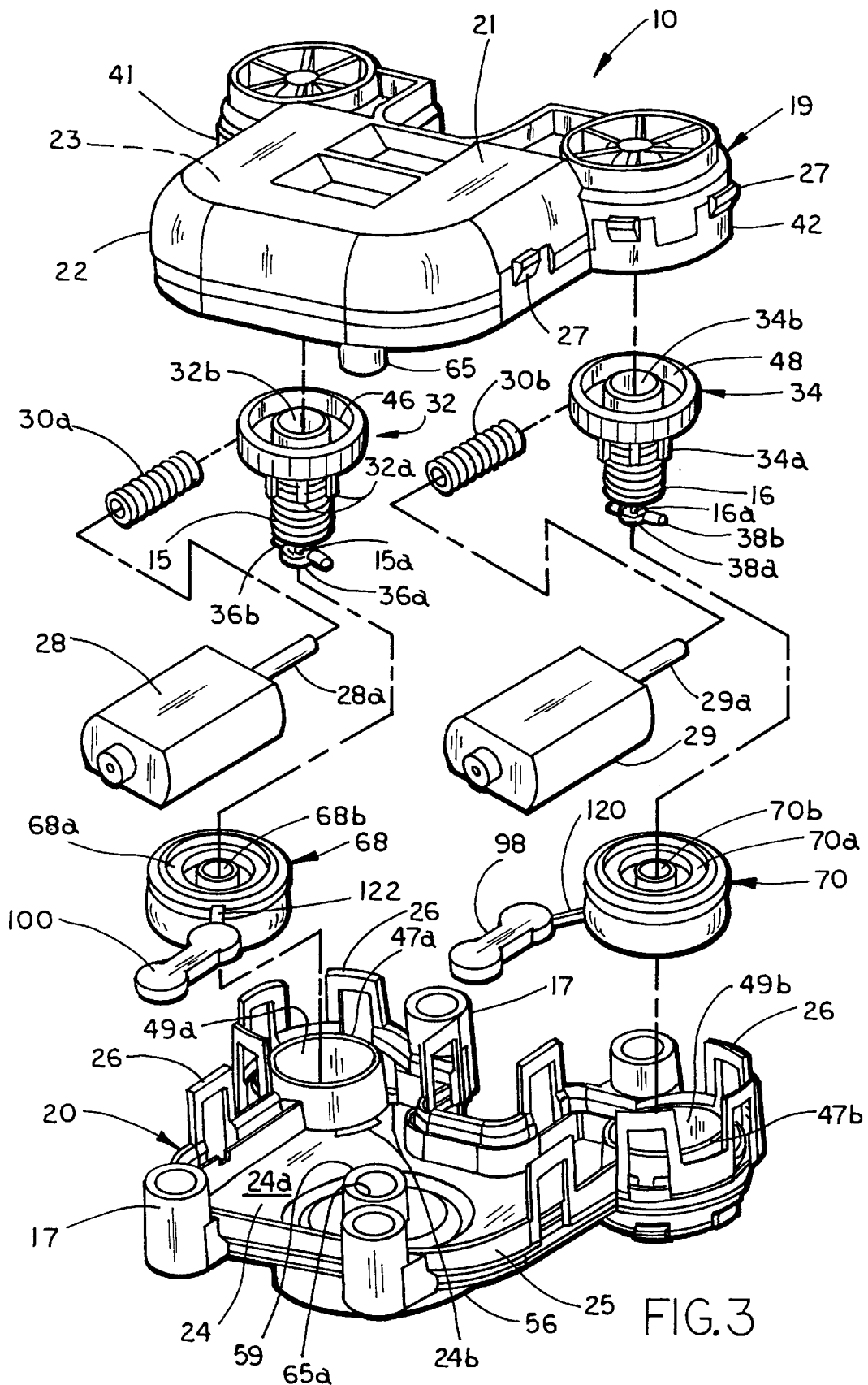
FIG. 3 is an exploded perspective view of the actuator assembly of FIG. 1 when inverted.
Figure 4:
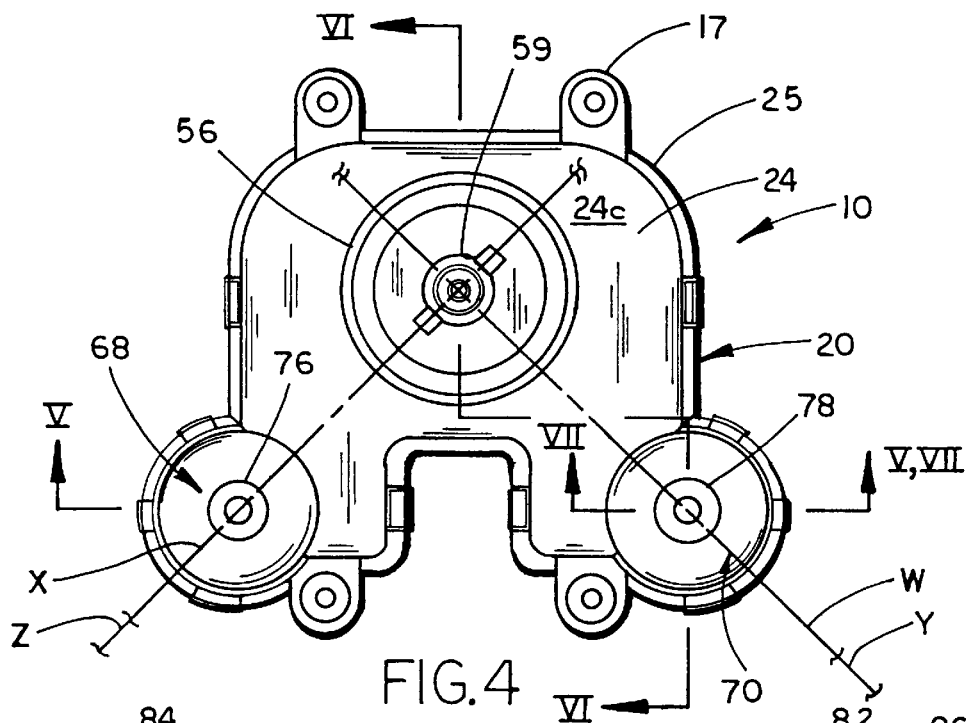
FIG. 4 is a top plan view of a cover of the actuator assembly.

With reference to FIGS. 2 and 3, first or base housing member 19 includes a base wall 21 and a side wall 22 that extends around the perimeter of the base wall 21 to form a base compartment 23. Second housing member 20 similarly includes a base wall 24 and a side wall 25 that extends around the perimeter of base wall 24 to form a cover. Side wall 25 preferably includes a plurality of inverted U-shaped connectors 26 that engage corresponding tabs or detents 27 provided on the exterior of side wall 22 of base housing member 19 to releasably secure second housing member 20 to first housing member 19. Base compartment 23 houses a pair of reversible electric motors 28 and 29 which are supported on base wall 21 of base housing member 19 and are held in place by resilient arms (not shown) that extend from the base wall 21 in a snap fit arrangement. As best seen in FIG. 3, the shafts 28a and 29a of reversible electric motors 28 and 29 include worm gears 30a and 30b for driving gearing or gear assemblies 32 and 34, also housed and supported for rotational movement in base compartment 23. Gear assemblies 32 and 34, in turn, drive telescoping positioning members 15 and 16 to adjust the orientation of mirror element 13 and backing plate 14 housed in mirror assembly 12. Preferably, motors 28, 29 are sold under the model number FC-260RD or FK-130RH available from Mabuchi Motor, New York, N.Y.

Figure 5:
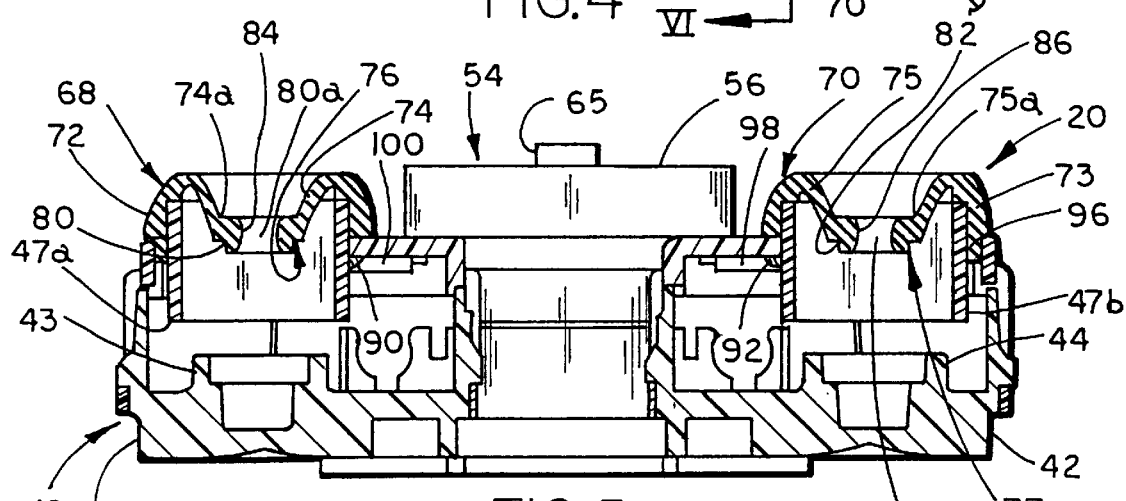
FIG. 5 is a cross-sectional view taken along line V—V of FIG. 4.
Figure 7:
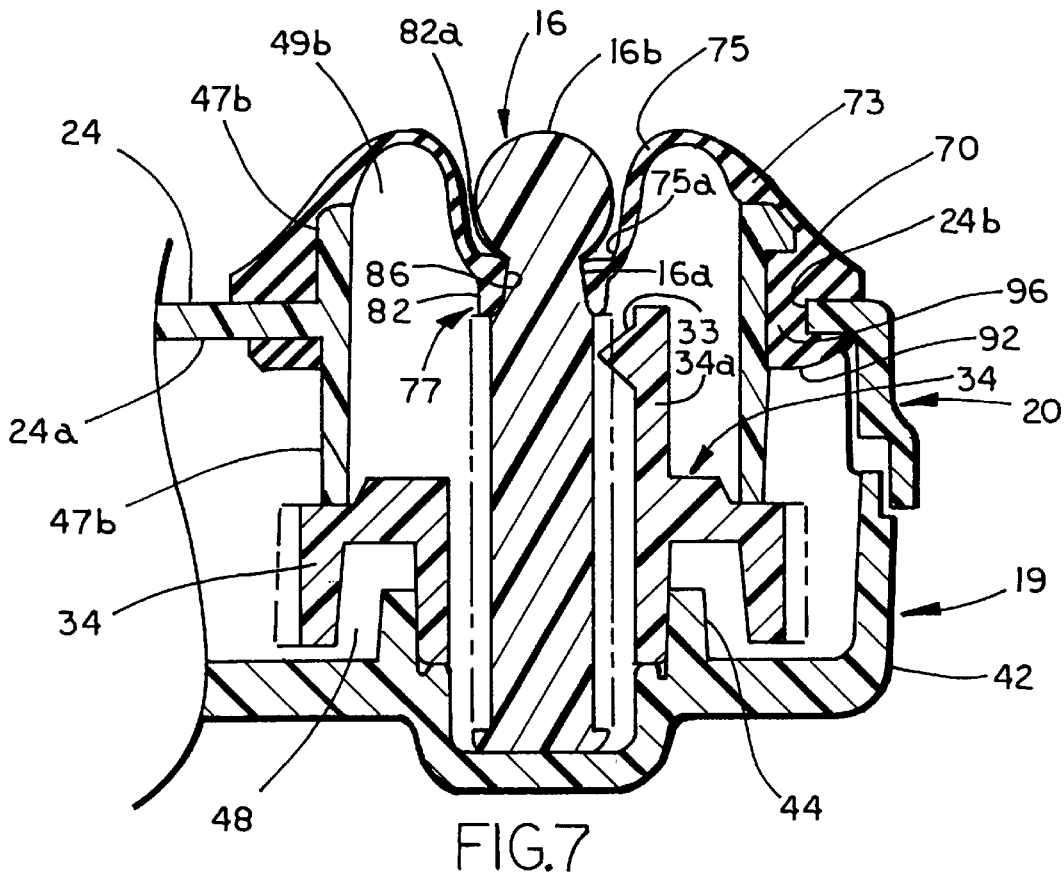
FIG. 7 is an enlarged cross-sectional view taken along line VII—VII of FIG. 4.
Figure 13:
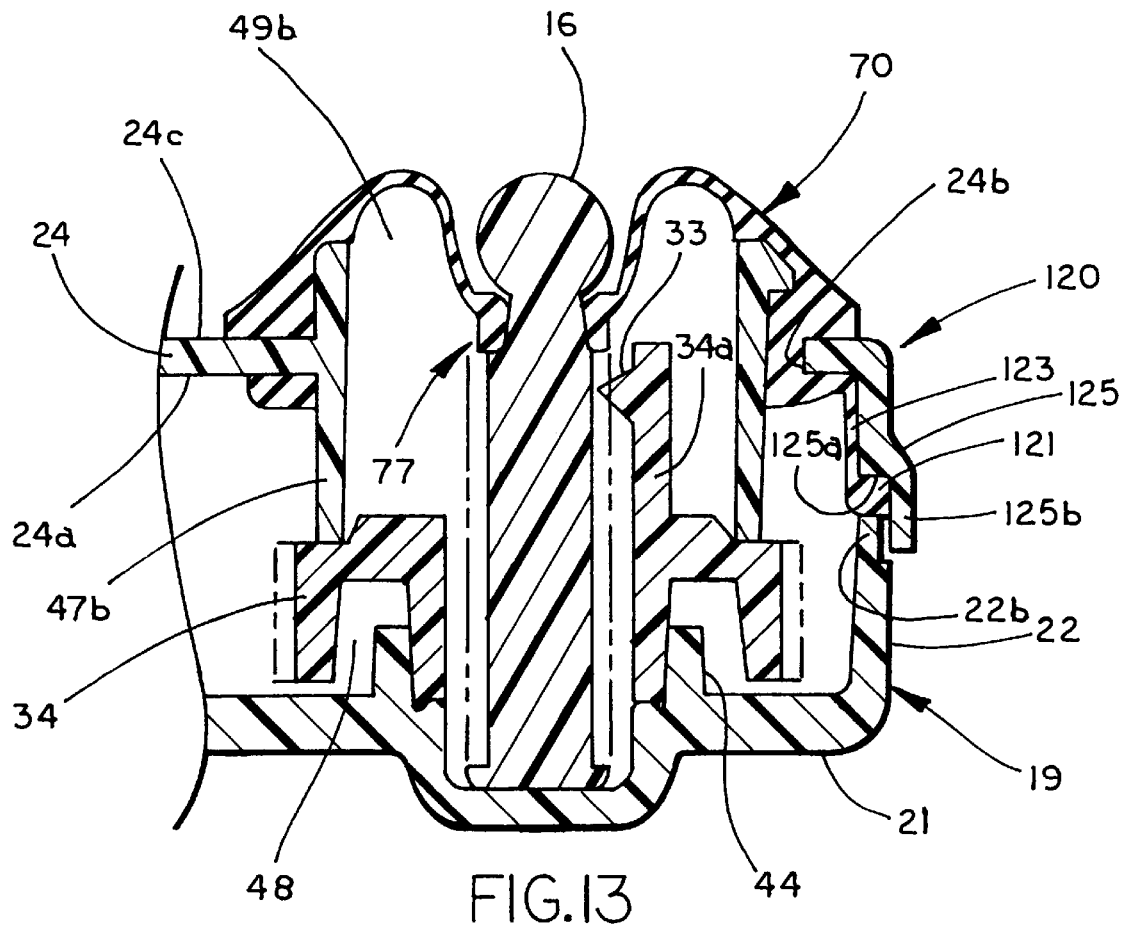
FIG. 13 is an enlarged cross-sectional view similar to FIG. 7 of a fourth embodiment of the cover.

Gear assemblies 32 and 34 are supported on and journaled in cylindrical receptacles 41 and 42 formed in first housing member 19 (FIG. 5). Receptacles 41 and 42 include annular walls 43 and 44 which extend into annular recesses 46 and 48 formed on the bottom surfaces of the gears of gear assemblies 32 and 34 to rotatably support gear assemblies 32 and 34 in base compartment 23 (FIGS. 2, 3 and 7). Each gear assembly 32, 34 includes a plurality of circumferentially spaced projecting arms 32a, 34a with an internal thread 33 (FIG. 7) formed at each of their respective distal ends for engaging and meshing with threads on positioning members 15 and 16. Each plurality of projecting arms 32a, 34a define cylindrical passages 32b, 34b therebetween which extend through the gears of gear assemblies 32 and 34, respectively, to receive telescoping positioning members 15 and 16 (FIGS. 2 and 3). The positioning members extend into sockets 50a (FIG. 2) provided on the back surface of backing plate 14 and are held against rotation by pins 36b, 38b which extend transversely through the distal ends of the respective positioning members 15 and 16. When gear assembly 32 is driven, projecting arm 32a rotates with gear assembly 32 to drive non-rotational positioning member 15 to telescope in or out of passage 32b, depending the direction of the gear's rotation. Similarly, when gear assembly 34 is driven, projecting arm 34a drives positioning member 16 to telescope in or out of passage 34b. Gear assemblies 32 and 34 are each held in place by annular walls 47a and 47b which extend from base wall 24 of upper housing member 20 and lightly engage or have end surfaces which are slightly spaced from gear assemblies 32, 34 (FIGS. 7 and 13). As positioning members 15, 16 telescope in and out of passages 32b, 34b, end portions of the positioning members extend and retract through passages 49a and 49b defined by annular walls 47a and 47b provided in second housing member 20 to push and pull on the back surface 50 of backing plate 14 of mirror element 13 (FIG. 2).

As shown in FIG. 2, second housing member 20 includes a pivot assembly 54 which cooperates with mirror backing plate 14 to fix the mirror element's point or center of rotation. Pivot assembly 54 includes a socket member 56 formed integrally on housing 20 that cooperates with a truncated, semi-spherical flange 57 formed on back surface 50 of mirror backing plate 14 (FIG. 2). The socket member 56 includes a semi-spherical recess 58 with a central collar 59 and a semi-spherical insert 60 that is rotationally fixed to the semi-spherical recess 58 by a pivot screw 62 and pivot spring 64. As best seen in FIG. 2, pivot screw 62 extends through pivot spring 64 and insert 60 and into a threaded boss structure 65 that projects through passage 65a in recess 58 (FIG. 3). Semi-spherical flange 57 is interposed and slidably captured between insert 60 and recess 58 such that mirror backing plate 14 is free to pivot about pivot assembly 54 on semi-spherical flange 57. When positioning member 15 extends, mirror backing plate 14 and mirror element 13 pivot on pivot structure 54 about axis W. Similarly, when pivoting member 16 extends, mirror backing plate 14 and mirror element 13 pivot on pivotal structure 54 about axis X. Note that when positioning member 15 extends or retracts, the orientation of axis W is changed but remains along plane Y. Similarly, when positioning member 16 extends or contracts, axis X moves up and down along plane Z. Consequently, the orientation of mirror element 13 can be changed to an infinite number of positions between the bounds of the fully extended and fully retracted positions of the positioning members and any combination thereof.

In order to seal openings 49a and 49b, second housing member 20 includes a pair of weather sealing diaphragms or boots 68 and 70. As previously mentioned, diaphragms 68 and 70 are preferably injection molded with the second housing member 20. The method of molding may include insert molding or two-shot molding. Insert molding, also known as over-molding, includes the steps of first molding the second housing member 20 in a first molding apparatus and then transferring the molded second housing member 20 to a second molding apparatus in which the gasket material is molded onto the surface of the housing member 20. On the other hand, in two-shot molding, the molding apparatus includes two injection barrels. The two-shot molding apparatus molds the second housing member in a first part of the molding apparatus and then either indexes the mold holding the molded second housing member to the next barrel to inject the gasket material or rotates the mold holding the second housing member so that the gasket material can be injected from the second barrel. The advantage of the two-shot molding process is that the molding apparatus is compact and, therefore, reduces the space requirements. Furthermore, the two-shot molding process tends to have a higher precision than the conventional insert molding. Moreover, the two-shot molding process provides significant time saving during manufacture and reduces the assembly time. A suitable two-shot molding apparatus is available from Arburg, Millington, Conn.

As best seen in FIGS. 3 and 5, diaphragms 68 and 70 comprise annular boots. Boots 68 and 70 each include an outer annular wall 72, 73, a flexible wall 74, 75, and a central sealing collar 76, 77, with each collar 76, 77 including a cylindrical wall 80, 82. First open ends 68a and 70a of boots 68, 70, respectively, which are defined by the open ends of the respective outer annular walls 72, 73, extends around annular wall 47a, 47b of passages 49a, 49b, respectively, to thereby seal the openings formed by passages 49a and 49b through upper housing member 20. The second open ends 68b and 70b of boots 68, 70, defined by the open ends of collars 76, 77, extend around the necks 15a, 16a of positioning members 15 and 16, respectively, to thereby seal and engage positioning members 15 and 16. Flexible walls 74, 75 permit second open ends 68b and 70b to move between a retracted position within the annular walls 47a and 47b, respectively, to an extended position beyond annular walls 47a and 47b thereby maintaining a fluid tight seal between upper housing member 20 and the position members 15 and 16.

Figure 8:
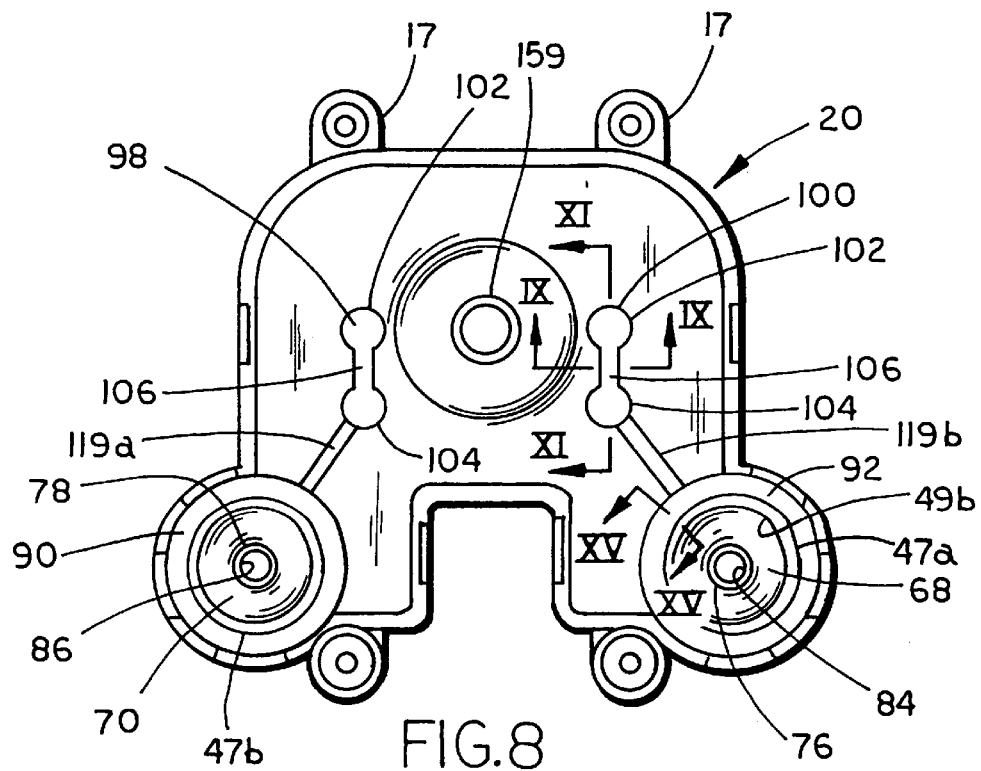
FIG. 8 is a bottom plan view showing the interior of the cover of the actuator assembly including a pair of noise dampeners.

As shown in FIG. 7, cylindrical walls 80 and 82 of collars 76 and 77 preferably include profiled inner surfaces 84 and 86, respectively, which match the outer surface of the necks 15a and 16a of positioning members 15 and 16 to increase the contact surface and, thereby, provide an increased sealing surface on positioning members 15 and 16. Sealing collars 76 and 77 project inwardly toward the interior of housing 18 from the inner perimeters 74a and 75a of flexible walls 74 and 75. In this manner, as positioning members 15 and 16 extend in and out of actuator housing 32, sealing collars 76 and 77 flex in and out of opening 49a and 49b of upper housing member 20 while fully engaged with positioning members 15 and 16 to assure a continuous seal with the positioning members 15 and 16. As best seen in FIG. 8, diaphragms 68 and 70 also include annular lips 90 and 92, respectively, which extend around annular walls 47a and 47b, respectively, of housing 20 on the inner surface 24a of base wall 24. Annular lips 90 and 92 each include transverse connectors 94 and 96 which extend through elongate openings 24b, provided in base wall 24 of second housing member 20, to outer annular walls 72 and 73. Transverse connectors 94 and 96, in combination with annular lips 90 and 92, provide further anchoring of diaphragms 68 and 70 to housing member 20.

Referring to FIGS. 5 and 8, a pair of motor noise dampeners 98 and 100 are provided, which are injection molded with or onto the inner surface 24a of base wall 24 of second housing member 20. Dampeners 98 and 100 are positioned to align with motors 28 and 29 in the completed assembly when upper and lower housing members 19 and 20 are secured together. Dampeners 98 and 100 press against motors 28 and 29 when upper and lower housing members 19 and 20 are secured together and, therefore, dampen the noise from the motors. Preferably, dampeners 98 and 100 are injection molded with second housing member 20 and may be mechanically interlocked or chemically adhered to the base wall 24 of housing member 20.

As best seen in FIG. 8, dampeners 98 and 100 are "dog bone" shaped with each dampener having circular ends 102, 104 and a transverse elongate section 106 which extends between circular ends 102 and 104. The shape of dampeners 98 and 100 may vary—the "dog bone" shape illustrated in the figures is just one example and not intended to limit the scope of protection. Preferably, base wall 24 includes a pair of recesses or depressions 108 on its inner surface 24a into which dampeners 98 and 100 are injected.

Depressions 108 may comprise channel shaped depressions 109 as shown in FIG. 9. Alternatively, base wall 24 may include depressions 108', which comprise beveled grooves having reverse beveled sides 110 and 112 forming a reverse chamfer, which provides mechanical locking of the dampeners 98 and 100 to base wall 24 (FIG. 10). It should be understood that where a beveled groove is provided on base wall 24, dampeners 98 and 100 may be inserted into depression 108' using mechanical means rather than molding.

In yet another embodiment, base wall 24 may include a plurality of apertures or openings 114 which extend from the inner surface 24a to the outer surface 24c of base wall 24. When dampeners 98 and 100 are injection molded onto the inner surface 24a of base wall 24 of second housing member 20 over apertures 14, the gasket material forming the dampeners 98 and 100 extends through apertures 114 to outer surface 24c of base wall 24 and forms a plurality of leads or prongs 116 and enlarged ends 118. In this manner, when the gasket material is cured, dampeners 98 and 100 are mechanically locked or anchored to base 24 by prongs 116 and enlarged ends 118.

The gasket material forming boots or diaphragms 68 and 70 and motor pads 98 and 100 is preferably a thermoplastic elastomer, such as Kraton (TPE) G2705 which is available from GLS Corp., Kerry, Ill. Other suitable gasket materials are TPR (Thermoplastic Rubber) or TPU (Thermoplastic Urethane). As described previously, second housing member 20 may comprise a glass-filled polypropylene material or the like, in which case the gasket material forming the seals and dampeners will chemically bond and adhere to base wall 24. Alternatively, the boots and diaphragms may be mechanically locked with base wall 24 in a similar manner to noise dampeners 98 and 100.

Figure 15:
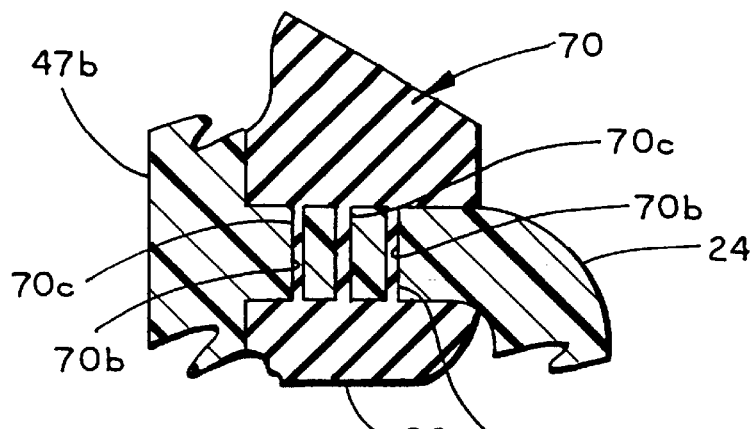
FIG. 15 is an enlarged cross-sectional view taken along line XV—XV of FIG. 8 illustrating a method of mechanically locking the diaphragm to the cover.
Figure 16:
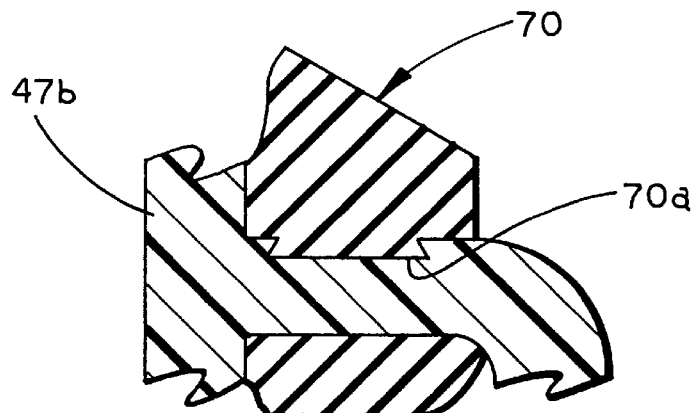
FIG. 16 is an enlarged cross-sectional view similar to FIG. 15 illustrating a second method of mechanically locking the diaphragm to the cover.
Figure 17:
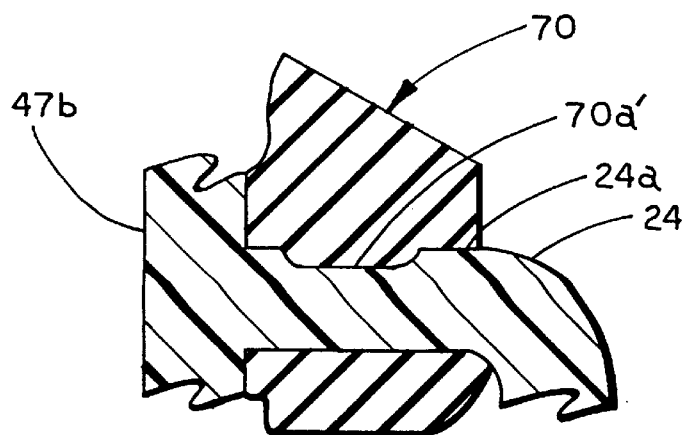
FIG. 17 is an enlarged cross-sectional view similar to FIG. 15 illustrating a third method of mechanically locking the diaphragm to the cover.

Referring to FIGS. 15–17, base wall 24 may include a recess or depression 70a, 70a' formed on upper surface 24a of base wall 24 into which the gasket material forming diaphragms 68 and 70 may be injection molded. Similar to depressions 108, the depressions may comprise channel shaped-grooves (70a) with beveled side walls to mechanically hold the diaphragm 68, 70 only base wall 24. Alternatively, base wall 24 may include a plurality of apertures 70b that extend through base wall 24 so that when the gasket material is injection molded onto base wall 24, the gasket material flows through apertures 70b to form prongs 70c that extend through to lip 92 on the inner surface of base wall 24. The recess, beveled groove, and the prongs mechanically lock or anchor diaphragms 68 and 70 to base wall 24. When diaphragms 68 and 70 are mechanically locked to base wall 24, the material of the housing members may comprise ABS or PBT.

When injection molding boots 68 and 70 and dampeners 98 and 100, a hot runner system may be used. In hot runner systems a single injection point or multiple injection points may be provided which direct the gasket material to the molding locations of the diaphragms and dampeners. Each molding location may include a designated gate in which case the need for cross-overs or feeders is eliminated. However, where the number of molding locations exceeds the number of gates, then cross-overs are needed. In the illustrated embodiment, the number of molded structures (68, 70, 98, 100) exceeds the number of gates provided in the hot-runner system and, therefore, cross-overs 119a and 119b are needed to direct the flow of the gasket material between the adjoining molded structures. As best seen in FIG. 8, two cross-overs 119a and 119b are provided to direct the flow of the gasket material either from boot 68, 70 to dampener 98, 100 or from dampener 98, 100 to boot 68, 70 depending on the location of the gate. As explained above, these cross overs 119a and 119b may be eliminated where the number of gates equals the number of molded structures. It can also be appreciated that a third cross-over is needed where only a single gate is provided in the hot-runner system.

Figure 14:
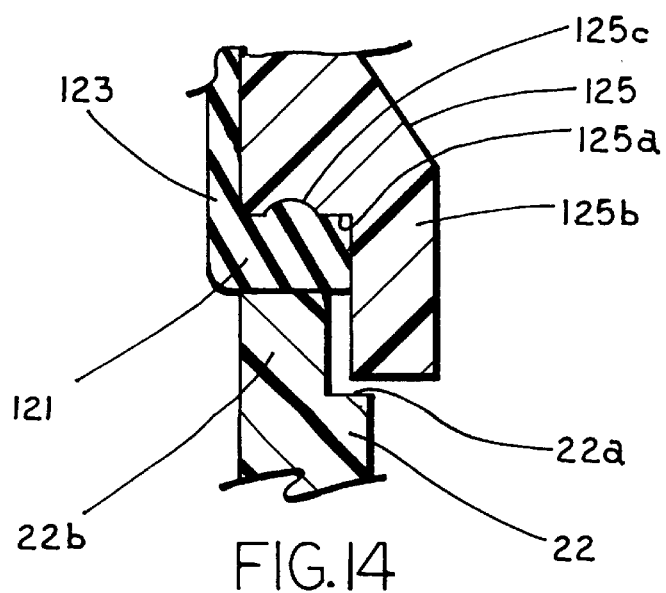
FIG. 14 is an enlarged view of the integral perimeter seal of FIGS. 12 and 13.

Referring to FIG. 12, a second embodiment of the second housing member 120 is shown. Second housing member 120 is of similar construction to housing 20, except that housing 120 further includes an integral gasket seal 121, which extends around the perimeter of second housing 120 inwardly of an outward sidewall 125. Similar to boots 68, 70 and dampeners 98 and 100, gasket seal 121 is preferably integrally molded with second housing 120. As best seen in FIG. 14, the gasket material is injected and molded onto a landing or shoulder 125a of side wall 125 so that when second housing member 120 is secured to first housing member 19, gasket seal 121 will seal the perimeter connection between the two housing members. Sidewall 125 includes an offset portion 125b which overlaps with an upwardly extending offset peripheral portion 22b of sidewall 22 of lower housing member 19 to provide a first outermost barrier to the elements. Preferably, side wall 22 of lower housing member 19 includes a horizontal offset 22a to allow a closer fit-up between the overlapping perimeters of sidewalls 125 and 22. Again, integral gasket seal 121 may be molded separately from the other molded structures (68, 70, 98, 100) in which case no cross-overs or feeders are required. Where the hot runner system includes fewer gates than there are molded structures, as described in reference to diaphragms 68 and 70 and dampeners 98 and 100, cross-overs, however, are required to permit the flow of the gasket material from the respective gate to the several molded structures, including the gasket seal 121.

In the illustrated embodiment, in FIGS. 13 and 14, cross-over 123 extends from diaphragm 70 to gasket seal 121. Preferably, there are a plurality of cross-overs (123) between diaphragms 68 and 70 and the gasket seal 121 to assure that the gasket material flows along the entire perimeter of the second housing member 120 over the full length of seal 121. Moreover, additional cross-overs 223a and 224a may extend between dampeners 98 and 100, respectively, and gasket seal 121 to reduce the length of the flow path. It should be understood from the foregoing that the number of cross-overs depend on the number of gates and also depend on the hot runner system and the flow properties of the particular gasket material used.

In the illustrated embodiment, in FIG. 13, gasket seal 121 is molded with the planar, upper surface of shoulder 125a. However, as best seen in FIG. 14, shoulder 125a may include a depression 125c to increase the contact surface and thereby improves adhesion between gasket seal 121 and second housing member 120.

Figure 6:
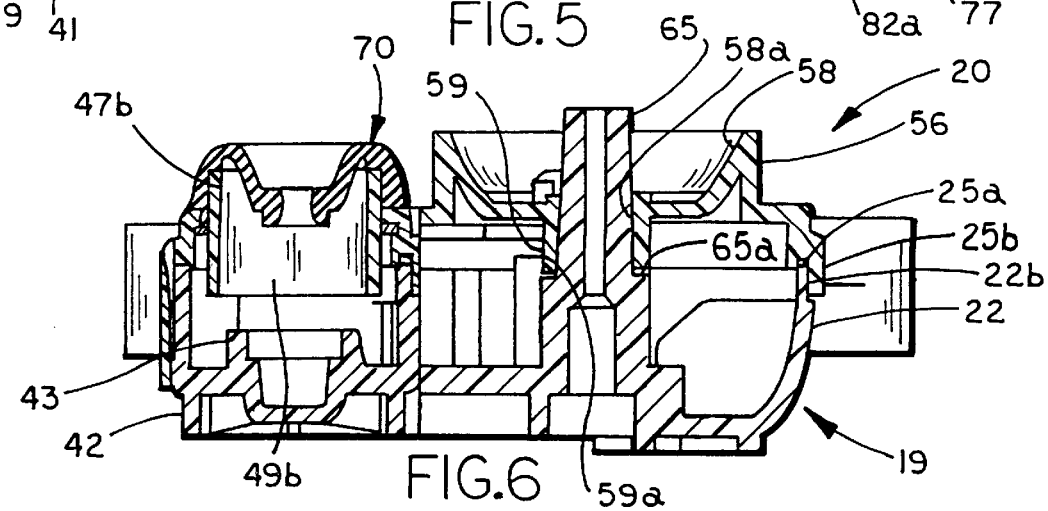
FIG. 6 is a cross-sectional view taken along line VI—VI of FIG. 4.

Referring to FIG. 12, a third weather seal 221 may be provided around the distal end of collar 59 of socket member 56. Seal 221 is similarly preferably injection molded with second housing member 20. Gasket seal 221 abuts a shoulder 65a of boss structure 65 and therefore provides a seal for the ball and socket connection between mirror backing plate 14 and second housing member 120 (FIG. 6). Moreover, the gasket material forming seal 221 may be directed to collar 59 by cross-overs 223b and 224b extending from dampeners 98 and 100, respectively, to the distal end of collar 59.

In addition to providing an improved seal, integral gasket seal 121 reduces the relative play between the upper and lower housing members 19 and 120. Moreover, by having an integral gasket seal, upper and lower housing members 19 and 120 may be quickly assembled, disassembled, and re-assembled without the attendant problems and costs associated with die cut gaskets. The integral diaphragms similarly provide enhanced seals and, like the integral motor dampeners and gasket seal, reduce the assembly and disassemble time.

Furthermore while several forms of the invention have been shown and described, other forms will now be apparent to those skilled in the art. For instance, some or all the molded structures (68, 70, 98, 100, 121, 221) may be chemically bonded to the respective surfaces on second housing members 20, 120. Chemically bonding is achieved by selecting the material of the housing and gasket material such that when the gasket material is in a semi-molten state and is placed or flowed onto the housing, chemical adhesion between the two polymers forming the housing and the gasket material occurs. As described, housing 20, 120 may comprise glass-filled polypropylene, and the gasket material may comprise a thermoplastic elastic family material. Moreover, the shape of the boots, motor pads and gasket seal may vary. The embodiments of the invention shown in the drawings and described above are not intended to limit the scope of the invention which is defined by the claims which follow.

The embodiments of the invention in which we claim exclusive property or privilege are defined as:

We claim:

1. A first housing member for an electrically-operated actuator for use in an exterior rearview mirror assembly, the mirror assembly including a reflective element, the actuator including a second housing, the second housing supporting at least one motor, gearing driven by the motor, and at least one mirror positioning member driven by the gearing to adjust the position of the mirror element, said first housing member comprising:

a base wall having an inner surface, an outer surface, a perimeter, and at least one passage for receiving the mirror positioning member, said base wall including an annular wall extending around said passage and at least one aperture spaced from said passage;

a sidewall connected to said base wall, said sidewall extending around said perimeter of said base wall and including at least one connector for securing said first housing to the second housing; and gasket material injection molded around said annular wall sealing said passage, said gasket material forming an annular lip on said inner surface of said base wall, said gasket material extending through said aperture in said base wall and forming a flexible diaphragm adjacent said outer surface of said base wall whereby said annular lip and said flexible diaphragm are interconnected through said aperture, said flexible diaphragm including a first opening molded around said annular wall and a second opening for receiving and sealingly engaging the positioning member, wherein portions of said flexible diaphragm which define said second opening move with the positioning member when the gearing drives the positioning member.

2. A first housing member for an actuator according to claim 1, said annular lip being connected to said flexible diaphragm at one or more locations.

3. A first housing member for an actuator according to claim 2, said base wall having at least one aperture adjacent said passage, said annular lip being connected to said flexible diaphragm through said aperture.

4. A first housing member for an actuator according to claim 1, said annular wall including an inner surface and an outer surface, said annular wall defining said passage, said diaphragm including an annular sealing surface sealingly engaging said outer surface of said base wall around said outer surface of said annular wall, said lip being connected to said annular sealing surface adjacent said outer surface of said annular wall.

5. A first housing member for an actuator according to claim 1, said diaphragm including an elongated collar, said collar having a throughbore defining said opening for receiving the positioning member, and said collar for sealingly engaging the positioning member.

6. A first housing member for an actuator according to claim 5, said elongated collar having an inner sealing surface adapted to conform to the shape of the positioning member to thereby provide increased contact between said sealing surface and the positioning member.

7. A first housing member for an actuator according to claim 1, said base wall further including gasket material injected thereon to form a noise dampener, said noise dampener projecting from said inner surface of said base wall for dampening the noise of the motor.

8. A first housing member for an actuator according to claim 7, wherein said gasket material extends from said lip to said noise dampener.

9. A first housing member for an actuator according to claim 7, wherein said base wall includes a depression, said gasket material being injected into said depression to form one of said noise dampener and said flexible diaphragm.

10. A first housing member for an actuator device according to claim 9, wherein said depression includes beveled side walls.

11. A first housing member for an actuator according to claim 10, wherein said beveled side walls form a reverse chamfer to mechanically hold said one of said noise dampener and said flexible diaphragm on said base wall.

12. A first housing member for an actuator according to claim 7, wherein said base wall includes a plurality of apertures, said apertures extending through said base wall from said inner surface to said outer surface, said gasket material of one of said noise dampener and said flexible diaphragm extending through said plurality of apertures and forming enlarged ends on said outer surface, said enlarged ends mechanically locking said one of said noise dampener and said flexible diaphragm to said base wall.

13. A first housing member for an actuator according to claim 7, wherein said noise dampener comprises an elongate pad.

14. A first housing member for an actuator according to claim 7, wherein said gasket material forms a chemical adhesion with said first housing member.

15. A first housing member for an actuator according to claim 14, wherein said housing comprises a glass-filled polypropylene material.

16. A first housing member for an actuator device according to claim 1, said side wall having a shoulder, and gasket material being injected onto said shoulder to thereby form a gasket seal for sealing said first housing member to the second housing member when said first housing member is secured to the second housing member.

17. A first housing member for an actuator device according to claim 1, wherein said gasket material comprises a thermoplastic elastic material.

18. A first housing member according to claim 1, wherein said gasket material is chemically adhered to said first housing member.

19. A first housing member for an actuator device according to claim 1, wherein said housing member comprises a glass-filled polypropylene material.

20. A first housing member for an electrically-operated actuator for use in an exterior rearview mirror assembly, the actuator including a second housing member, a motor supported in the second housing member, gearing supported in the second housing member driven by the motor, and a mirror positioning rod driven by the gearing and the motor, said first housing member comprising:

a base wall having inner and outer surfaces, a passage formed therethrough, an annular wall extending around said passage, and at least one opening spaced from said passage, said passage for receiving the mirror positioning rod;

a side wall extending around said base wall, said side wall including at least one connector for securing said first housing member to the second housing member; and a flexible diaphragm extending over said passage for sealing the positioning rod with said first housing member, said flexible diaphragm having a first sealing surface sealingly engaging said base wall around said passage and said annular wall and a second sealing surface for sealingly engaging the positioning rod, said flexible diaphragm further including a lip, said lip sealingly engaging the inner surface of said base wall, and said lip being connected to said first sealing surface of said flexible diaphragm through said at least one opening in said base wall.

21. A first housing member for an actuator device according to claim 20, said flexible diaphragm including a collar for sealingly engaging the positioning rod, said collar defining said second opening for receiving the respective positioning rod therethrough.

22. A first housing member for an actuator device according to claim 20, said base wall including at least one noise dampener secured thereto, said noise dampener projecting from said base wall for dampening the noise of the motor.

23. A first housing member for an actuator device according to claim 22, wherein said base wall includes a plurality of apertures, said apertures extending through said base wall from said inner surface to said outer surface, said gasket material of said noise dampener extending through said plurality of apertures and forming a plurality of leads and enlarged ends on said outer surface of said base wall, said leads and said enlarged ends anchoring said noise dampener to said base wall.

24. A first housing member for an actuator device according to claim 22, wherein said diaphragm and said noise dampener are interconnected by a cross-over.

25. A first housing member for an actuator device according to claim 22 wherein said base wall includes a depression, said gasket material being injected into said depression to form said noise dampener.

26. A first housing member for an actuator device according to claim 25, wherein said depression includes beveled side walls, said beveled side walls forming a reverse chamfer to hold said noise dampener on said base wall.

27. A first housing member for an actuator device according to claim 20, wherein said base wall and said side wall comprise glass-filled polypropylene.

28. A first housing member for an actuator according to claim 20, wherein said annular wall projects from said base wall.

29. A first housing member for an actuator according to claim 20, wherein said base wall includes a plurality of openings spaced from said passage, said lip being connected to said first sealing surface of said flexible diaphragm through said openings in said base wall.

30. A first housing member for an actuator according to claim 29, wherein said openings are spaced around said annular wall.

31. A first housing member for an actuator according to claim 20, said diaphragm including a collar, said collar having a throughbore defining said opening for receiving the positioning member, and said collar for sealingly engaging the positioning member.

32. A first housing member for an actuator according to claim 31, said collar having an inner sealing surface adapted to conform to the shape of the positioning member to thereby provide increased contact between said sealing surface and the positioning member.

33. A first housing member for an actuator device according to claim 20, wherein said flexible diaphragm comprises a thermoplastic elastic material.

34. A first housing member for an electrically-operated actuator for use in an exterior rearview mirror assembly, mirror assembly including reflective element, the actuator including a second housing, the second housing supporting at least one motor, gearing driven by the motor, and at least one mirror positioning member driven by the gearing to adjust the position of the mirror element, said first housing member comprising:

a base wall having an inner surface, an outer surface, a perimeter, and at least one passage for receiving the mirror positioning member, said base including an annular wall, said annular wall including an inner surface and an outer surface, said annular wall defining said passage;

a side wall connected to said base wall, said side wall extending around said perimeter of said base wall and including at least one connector for securing said first housing to the second housing, and gasket material injection molded around said passage sealing said passage, said gasket forming an annular lip on said inner surface of said base wall, said gasket material extending through said base wall and forming a flexible diaphragm adjacent said outer surface of said base wall, said flexible diaphragm including a first opening molded around said passage and a second opening for receiving and sealingly engaging the positioning member, said diaphragm including an annular lip sealing surface sealingly engaging said outer surface of said base wall around said outer surface of said annular wall, said lip being interconnected to said annular sealing surface adjacent said outer surface of said annular wall, said base wall having a plurality of apertures spaced around said annular wall, said lip being connected to said diaphragm through said apertures, wherein said portions of said flexible diaphragm which define said second opening move with the positioning member when the gearing drives the positioning member.

35. A first housing member for an actuator according to claim 34, wherein said apertures comprise elongated openings.

36. A first housing member for an electrically-operated actuator for use in an exterior rearview mirror assembly, the actuator including a second housing member, a motor supported in the second housing member, gearing supported in the second housing member driven by the motor, and a mirror positioning rod driven by the gearing and the motor, said first housing member comprising:

a base wall having inner and outer surfaces, a passage formed therethrough, and a plurality of openings spaced around said passage, said passage for receiving the mirror positioning rod said base wall including an annular wall extending around said passage, said annular wall having an outer perimeter, and said openings being spaced around said outer perimeter of said annular wall;

a side wall extending around said base wall, said side wall including at least one connector for securing said first housing member to the second housing member; and a flexible diaphragm extending over said passage for sealing the positioning rod with said first housing member, said flexible diaphragm having a first sealing surface sealingly engaging said base wall around said passage and a second sealing surface for sealingly engaging the positioning rod, said flexible diaphragm further including a lip, said lip sealingly engaging the inner surface of said base wall, and said lip being connected to said first sealing surface of said flexible diaphragm through said openings in said base wall.

37. A first housing member for an actuator device according to claim 36, wherein said openings comprise elongate openings.

* * * * *

UNITED STATES PATENT AND TRADEMARK OFFICE
CERTIFICATE OF CORRECTION

PATENT NO.   : 5,986,364
DATED        : November 16, 1999
INVENTOR(S)  : Robert Lee Bingle, David Kevin Willmore and Robert E. Schnell It is certified that error appears in the above-identified patent and that said Letters Patent is hereby corrected as shown below:

Column 4,
Line 51, "minor" should be -- mirror --

Column 8,
Line 13, "14" should be -- 114 --
Line 38, "only" should be -- on --

Column 13,
Line 31, "," should be -- ; -- after "housing"

Signed and Sealed this

Thirtieth Day of October, 2001

*Attest:*

NICHOLAS P. GODICI
*Attesting Officer*     *Acting Director of the United States Patent and Trademark Office*